US008805613B2

(12) United States Patent
Chainer et al.

(10) Patent No.: US 8,805,613 B2
(45) Date of Patent: Aug. 12, 2014

(54) METHOD FOR ENVIRONMENTAL SENSING

(75) Inventors: Timothy J. Chainer, Putnam Valley, NY (US); Nitendra Rajput, New Delhi (IN); Bernice E. Rogowitz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 12/613,758

(22) Filed: Nov. 6, 2009

(65) Prior Publication Data

US 2010/0052891 A1 Mar. 4, 2010

Related U.S. Application Data

(62) Division of application No. 11/668,604, filed on Jan. 30, 2007.

(51) Int. Cl.
*G01V 3/00* (2006.01)
*G08B 1/08* (2006.01)

(52) U.S. Cl.
USPC .......................................... 702/2; 340/539.26

(58) Field of Classification Search
USPC ......... 702/3, 19, 22, 24, 30, 32, 183, 2, 1, 81, 702/84, 127, 130, 179, 181, 188–189; 340/517, 539.1, 539.11, 340/539.16–539.18, 539.22–539.24, 340/539.26–539.28, 601–602, 686.1; 73/170.16; 700/9, 28–29; 703/5, 11–12
See application file for complete search history.

(56) References Cited

U.S. PATENT DOCUMENTS

| 5,892,690 | A | 4/1999 | Boatman et al. |
| 6,356,842 | B1 | 3/2002 | Intriligator et al. ............... 702/3 |
| 6,731,952 | B2 | 5/2004 | Schaeffer et al. |
| 6,978,217 | B2* | 12/2005 | Morozumi et al. ........... 702/122 |
| 2002/0026284 | A1 | 2/2002 | Brown ............................. 702/3 |
| 2002/0029111 | A1 | 3/2002 | Peek et al. |
| 2002/0144537 | A1 | 10/2002 | Sharp et al. |
| 2003/0154055 | A1 | 8/2003 | Yoshimura ..................... 702/188 |
| 2004/0010372 | A1* | 1/2004 | Schwoegler ...................... 702/3 |
| 2005/0197775 | A1* | 9/2005 | Smith ............................... 702/3 |
| 2005/0222802 | A1 | 10/2005 | Tamura et al. |
| 2005/0240378 | A1* | 10/2005 | Smith et al. .................... 702/188 |
| 2006/0176169 | A1* | 8/2006 | Doolin et al. .................. 340/521 |
| 2007/0009104 | A1* | 1/2007 | Renkis ........................... 380/270 |
| 2007/0168131 | A1* | 7/2007 | Root et al. ........................ 702/3 |

OTHER PUBLICATIONS

Ken Hinckley et al., "Sensing Techniques for Mobile Interaction"; research.microsoft.com/users/kenh/papers/PPC-Sensing_bw.pdf.

(Continued)

*Primary Examiner* — Toan Le
(74) *Attorney, Agent, or Firm* — Daniel P. Morris; Ryan, Mason & Lewis, LLP

(57) ABSTRACT

Data pertaining to environmental information is acquired using sensors on a multiplicity of networked pervasive devices, and analyzed to determine occurrence of at least one environmental event. Such data can be obtained, for example, from an inventive wireless communications device including an antenna, transmit circuitry coupled to the antenna for transmission of radio frequency radiation therefrom, at least one environmental sensor configured to obtain environmental data, and a communications module coupled to the at least one environmental sensor and configured to cause transmission of a representation of the data via the antenna and the transmit circuitry.

7 Claims, 6 Drawing Sheets

(56) References Cited

OTHER PUBLICATIONS

Hans-W. Gellersen et al., "Multi-Sensor Context-Awareness in Mobile Devices and Smart Artefacts"; www.comp.lancs.ac.uk/~hwg/publ/monet.pdf.

Karin Leichtenstern et al., "Analysis of Built-in Mobile Phone Sensors for Supporting Interactions with the Real World"; www.medien.ifi.lmu.de/permid2005/pdf/KarinLeichtenstern_Permid2005.pdf.

S. Mangold et al., "Applying Pattern Recognition Techniques Based on Hidden Markov Models for Vehicular Position Location in Cellular Networks," 50th IEEE Vehicular Technology Conference (VTC1999-Fall), Sep. 1999, 5 pages.

"CX70 Emoty MMS at an Entirely New Level," Siemens Mobile—Mobile Phones Portal, available at: https://web.archive.org/web/20040911111811/http://www.siemens-mobile.com/cds/frontdoor/0,2241, hq_en_0_63511_rArNrNrNrN_pageType%253ADescription,00,html, Sep. 11, 2004, 2 pages.

A. Mihovska et al., "Location-Based VAS: Killer Applications for the Next-Generation Mobile Internet," 12th IEEE International Symposium on Personal, Indoor and Mobile Radio Communications, Sep. 2001, pp. B-50-B-54, vol. 1.

A. Marugame et al., "Focused Object Extraction with Multiple Cameras," IEEE Transactions on Circuits and Systems for Video Technology, Jun. 2000, pp. 530-540, vol. 10, No. 4.

S. Yaguchi et al., "Arbitrary Viewpoint Video Synthesis from Multiple Uncalibrated Cameras," IEEE Transactions on Systems, Man, and Cybernetics—Part B: Cybernetics, Feb. 2004, pp. 430-439, vol. 34, No. 1.

* cited by examiner

METHOD FOR ENVIRONMENTAL SENSING

CROSS-REFERENCE TO RELATED APPLICATIONS

This application is a divisional of U.S. patent application Ser. No. 11/668,604, filed Jan. 30, 2007, the complete disclosure of which is expressly incorporated by reference herein in its entirety for all purposes.

FIELD OF THE INVENTION

The present invention relates generally to the field of pervasive networks, and more particularly relates to the use of pervasive devices for mobile environmental sensing.

BACKGROUND OF THE INVENTION

The last few decades have seen an exponential increase in the worldwide use of pervasive devices, such as mobile phones, personal digital assistants (PDAs), game players, embedded processors, laptop computers and desktop computers. There continue to be great advances in both technological capability and ubiquity which serve to facilitate increasingly universal communications. Furthermore, these pervasive devices increasingly have integrated capabilities beyond mere telecommunications or computing; for example, such devices nowadays are frequently integrated with internal clocks, GPS systems, and image/video capture systems.

Nonetheless, advances in early detection and notification of environmental conditions have not kept pace with the overall advances in communications technology. Indeed, there have been many well-documented instances of ineffective communication. Some of these have occurred during disasters both natural (for example, the Asian Tsunami and Hurricane Katrina) and man-made (for example, the September 11 terrorist attacks) which resulted in literally thousands of deaths which could likely have been avoided had more timely information been provided both to governmental authorities and to those within the zone of danger. Today's limited early detection systems (for example, seismographs or fire lookouts) are limited not only in density and coverage area, but also lack the ability to collect and collate multiple stimuli in order to obtain a more detailed picture of the surrounding environment. Furthermore, current warning systems tend to focus on advisories communicated via mass media, which frequently are both overbroad (causing people to assume these advisories are irrelevant and thus may be safely ignored) and underbroad (failing to reach the populations most directly endangered who may not be actively monitoring the broadcast media, for example, beachgoers during the Asian Tsunami and office workers on September 11). Notification regarding non-disaster conditions also could benefit from improvement; for example, "macro" weather reports used to predict whether it is a good day for the beach or for boating may not accurately reflect local conditions at a beach or boating region of interest.

It would thus be desirable to overcome the limitations in previous approaches.

SUMMARY OF THE INVENTION

Principles of the present invention provide techniques for monitoring environmental conditions. In one aspect, an exemplary method includes the steps of acquiring data pertaining to environmental information using a multiplicity of sensors on a multiplicity of networked pervasive devices, and analyzing the data to determine occurrence of at least one environmental event.

In another aspect, an exemplary networked pervasive device associated with a network includes at least one environmental sensor configured to obtain environmental data, and a communications module coupled to the at least one environmental sensor and configured to cause transmission of a representation of the data via the network in a form for subsequent data mining within the network.

In yet another aspect, an exemplary method of providing a service for monitoring environmental conditions includes the steps of facilitating offering the monitoring service on a subscription basis, facilitating receiving subscriptions to the service from a plurality of subscribers, facilitating acquisition of data pertaining to environmental information using at least one sensor on at least one networked pervasive device, facilitating analysis of the data to determine occurrence of at least one environmental event, and facilitating notification of at least one of the subscribers of the occurrence of the event.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of exemplary methods and apparatus for monitoring environmental conditions. It is to be understood, however, that the techniques of the present invention are not limited to the methods and apparatus shown and described herein. Furthermore, as used herein, "environmental" data should be broadly construed to cover any data that can be sensed and should not be limited to hazard warnings or other specific examples that may be given.

Figure 1:
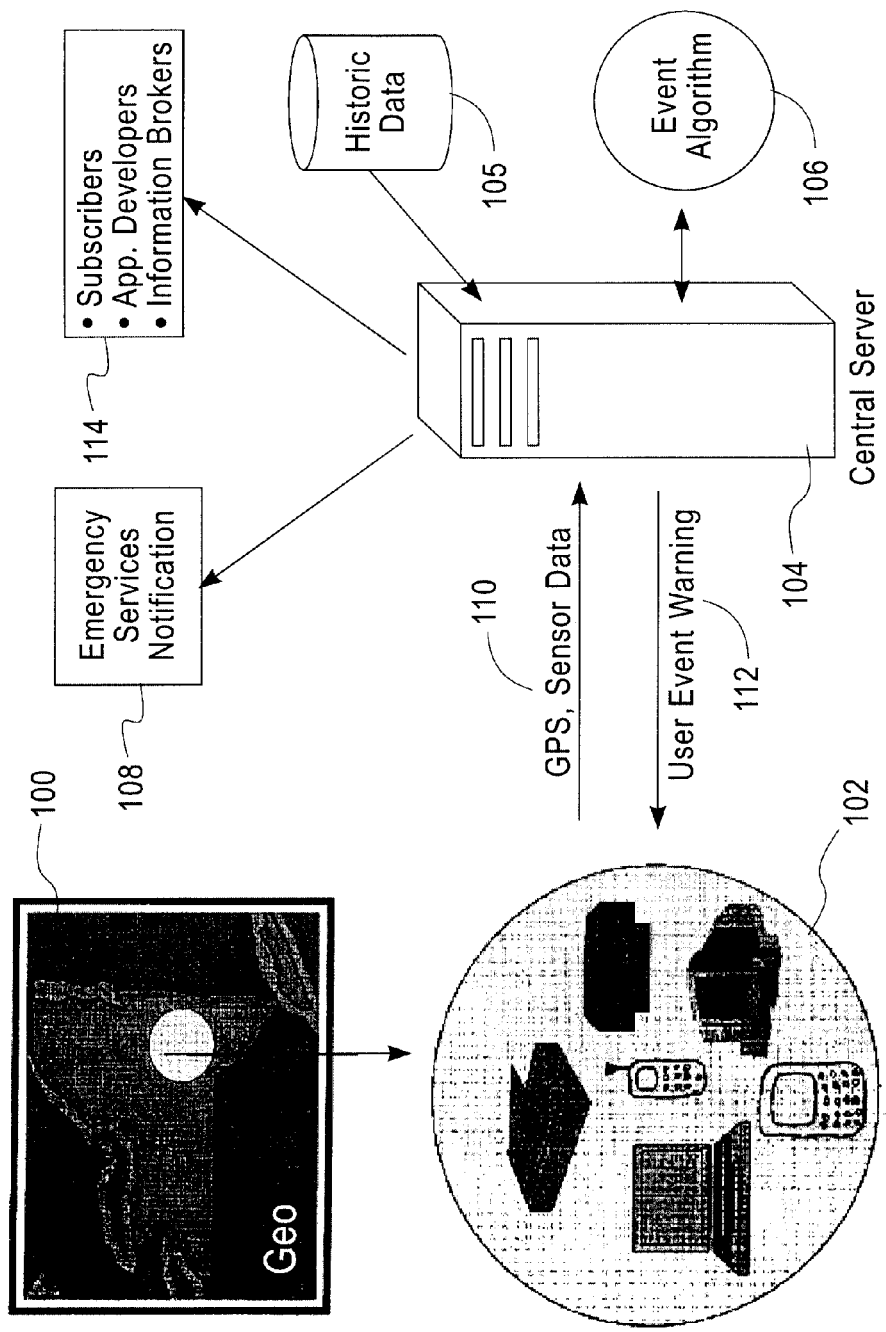
FIG. 1 depicts an illustrative embodiment of one or more aspects of the present invention.

FIG. 1 depicts an illustrative embodiment of one or more aspects of the present invention. Data from pervasive devices 102 (for example, mobile phones, PDAs, game systems, embedded processors, pocket computers, laptop computers and/or desktop computers) within a defined geographic region 100 can be monitored, analyzed and synthesized (for example, locally or by a central sever 104) to generate real time detection and analysis of events and features occurring in the environment. The central server makes use of any preexisting data 105 that is relevant to generate events. For example, the knowledge that thunderstorms are often followed by an increase in road accidents or the fact that highways K64, M-44 are prone to accidents will be used by the central server in addition to the data provided in 110. This aspect enables the synthesis of data from multiple types of sensors at all geographic locations. A second aspect of the invention allows the notification of users 112 (for example, via the pervasive computing devices) and/or emergency services 108, within a region currently or potentially affected by an event, regarding current conditions and suggested responses. A third aspect of this invention is the use of these previously-disclosed aspects in services offerings, for example, in the form of a business model to capture, analyze, synthesize and report events and features to subscribers, application developers or information brokers 114.

The sensors, which can be embedded into the pervasive computing devices using, for example, Micro-Electro-Mechanical Systems (MEMS) and/or System-on-package (SOP) technology, can include, by way of example and not limitation, images, video streams, temperature, shock, barometric pressure, chemical detection, radioactivity, user biometrics, and the like. Mobile devices can provide access to geographic locations not populated by fixed systems such as highways and outdoor areas, and can provide access to tens of millions of geographic locations; essentially, any location where any person is.

A server can collect this information and creates a view of the environment in both space and time and further analyze the data (for example, by using environmental event algorithm models 106 to determine within statistical certainty that an event is occurring in real time). The system can also combine and fuse data from multiple sensors, integrating information about time, location, temperature, sound, image, heat, infrared, and the like, to sense and understand higher-level features.

For example, on a macroscopic scale, an earthquake in California can be visualized by recording the real time "shock" (accelerometer) sensors in computer devices within a geographic area. On the microscopic scale, chemical sensors could be used to identify a gas leak in a particular location, while also detecting information from pressure sensors to find the wind direction. The two variables can be integrated to predict the direction of gas leakage and notify users, or to visualize the movement of the gas cloud over the environment. Combining information from multiple sensor networks ("data fusion") enables new applications. Such applications are not limited to disaster sensing and prediction. For example, sensors could be used to determine conditions for recreation, such as determining the local environment at, for example, a beach. Macroscopic weather forecasts often do not provide sufficient detail to determine if an individual would be comfortable at a beach along the ocean. However, sensing from multiple pervasive devices could provide information on local wind direction, wind temperature, humidity, sun intensity at ground level, beach population density and water temperature, which could be used by a machine implementing an intelligent algorithm to determine if conditions at a beach would meet an individual's comfort level. Weather information for sailing can be generated using the pervasive devices of the number of people that are present at a beach or other region near where one might wish to go sailing. The individual wind and light sensors on the pervasive device of each tourist on the beach (or other region) gives us the wind direction at the location of that particular tourist. By fusing and analyzing the data from the large number of such tourists on the beach, a map of the wind direction and the cloud formation on the sea shore can be generated. This can be matched against the pre-existing information of the ideal wind and/or light conditions for sailing near that particular beach (or other region). Thus, using the multitude of sensors on these devices, a score can be generated that provides information about how conducive the shore is for sailing. This information can be relayed to interested sailors who would not have to travel to the beach (or other region) and identify these conditions. Exemplary types of sensors and their local and global uses are summarized in the table below:

TABLE 1

| | | |
|---|---|---|
| Camera | 3D Scene of an enclosed space | To create a synthetic 3D view of the space for better scene understanding. |
| Temperature | Iso-temperature Contours | Use of iso-temperature contours to identify the cluster of people, to control air conditioning temperatures in a big gathering. |
| Chemical | Gas Leak identification | To detect gas leaks |
| Pressure | Air movements | To have a map of wind movements |
| Pressure + Chemical | Gas Leak direction | To inform where the gas is moving |
| Camera + Infrared | Terrorist identification | To identify terrorists |

Another exemplary application includes surveillance. For example, many people have cellular phones with image capture. A bag might be abandoned at an airport. Gas sensors might determine dangerous substances in the bag. Heat detectors might locate hidden criminals or terrorists who planted the bag. Data could be gathered passively (for example, gas, heat) or actively (for example, using cell phone cameras). In some embodiments, incentives could be provided for voluntary opt-in to address potential invasion-of-privacy concerns. Other types of surveillance could include a "worried parent" service that could track the location of a child and, for example, the presence of illegal drugs or alcohol, or excessive profanity (for example, via automatic speech recognition). Such approaches could also be adapted to tracking elderly parents, lost pets, and the like.

Figure 2:
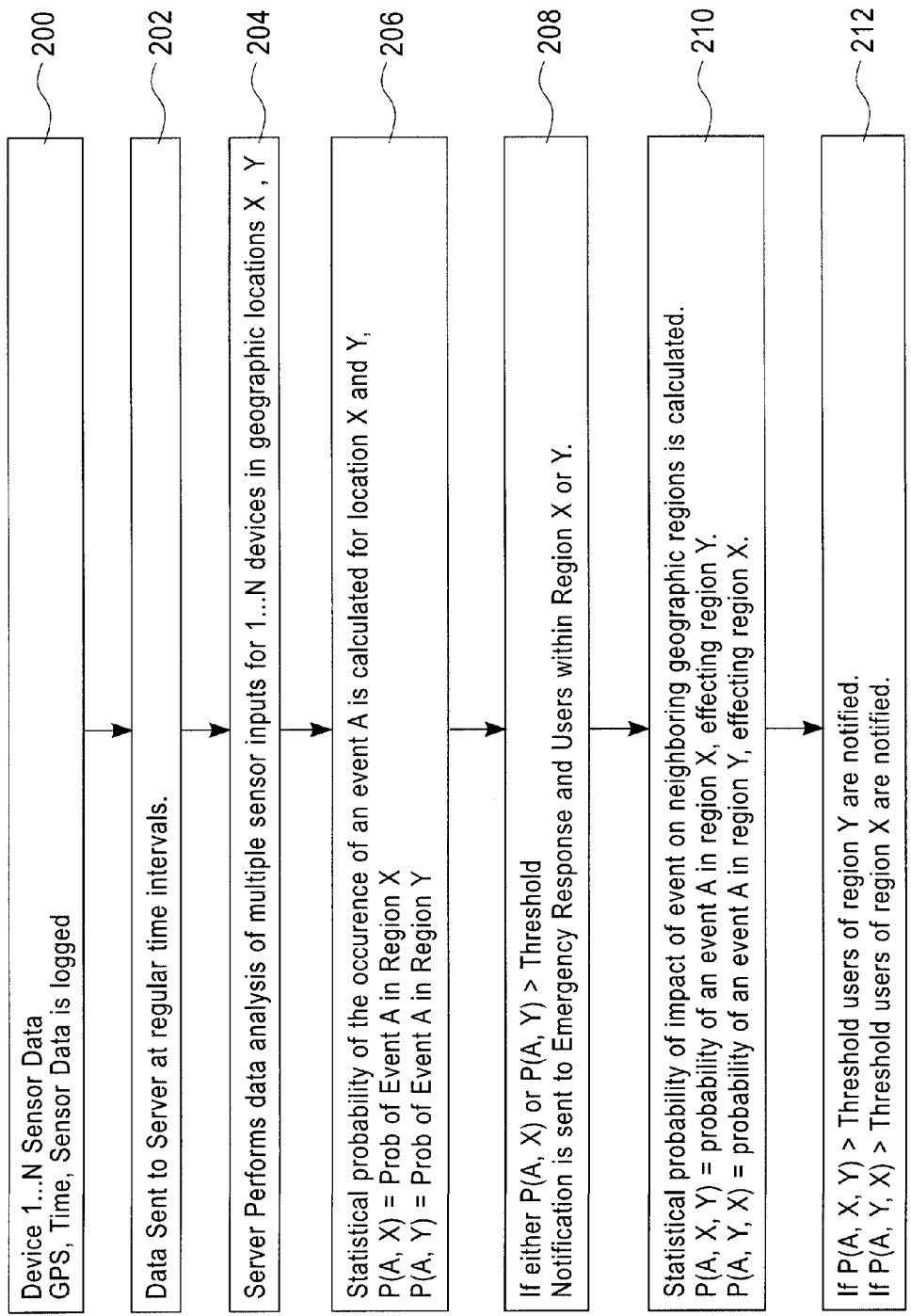
FIG. 2 shows an exemplary process flow for collecting and analyzing the data in accordance with an aspect of the present invention.

FIG. 2 shows an exemplary process flow for collecting and analyzing the data in accordance with an aspect of the present invention.

The data from one or more networked pervasive devices 1 . . . N are collected in step 200 and then sent to a central data server in step 202. This may operate using either a "push" mechanism (the devices initiates data transfer to the server) or a "pull" mechanism (the server initiates data transfer from the devices). In other embodiments, data may be sent responsive to a user action. Monitoring can be continuous or intermittent. The server logs the time and location of the pervasive device and whether it is mobile or stationary. This provides the server with temporal and spatial data pertaining to the environmental variables which follow.

In step 206 the server (in other embodiments, analysis can be carried out by one or more of the networked pervasive devices in addition to or in lieu of the central server) analyzes the data within geographic areas labeled X and Y and, based upon environmental models, can determine the probability an event is occurring in real time within the X and/or Y geographic area which is referred to as P (A, X) or P (A, Y). In step 208 the probability is compared to a threshold, which in this case is chosen to be, for exemplary purposes and not limitation, 0.7 or 70%, and if it exceeds that threshold within one of the geographic regions the server may send a notification to, for example, the users of the pervasive devices within the affected region and emergency response units. For example, an earthquake event can be detected by recording the real time shock data of devices within a geographic area or a chemical spill can be detected by changes in chemical composition. Analysis can be performed, for example, using artificial intelligence and/or pattern recognition techniques.

In step 210 the server determines if the event in region X will affect users in a neighboring region Y by calculating the probability that the event in one region would affect the other. For example, upon determining by means of chemical sensors that a gaseous discharge has occurred in region X, the server could analyze wind direction (obtained using wind direction sensors) to see whether region Y will be affected as well. Notification of individuals (including but not limited to users of one or more of the pervasive devices) or authorities (such as emergency responders) in a currently affected region, and/or a region likely to be affected in the future, is conducted in step 212. Past or real-time events can be detected, and future events can be predicted. In a subscription model, subscribers can be informed of detected or predicted events.

Figure 3:
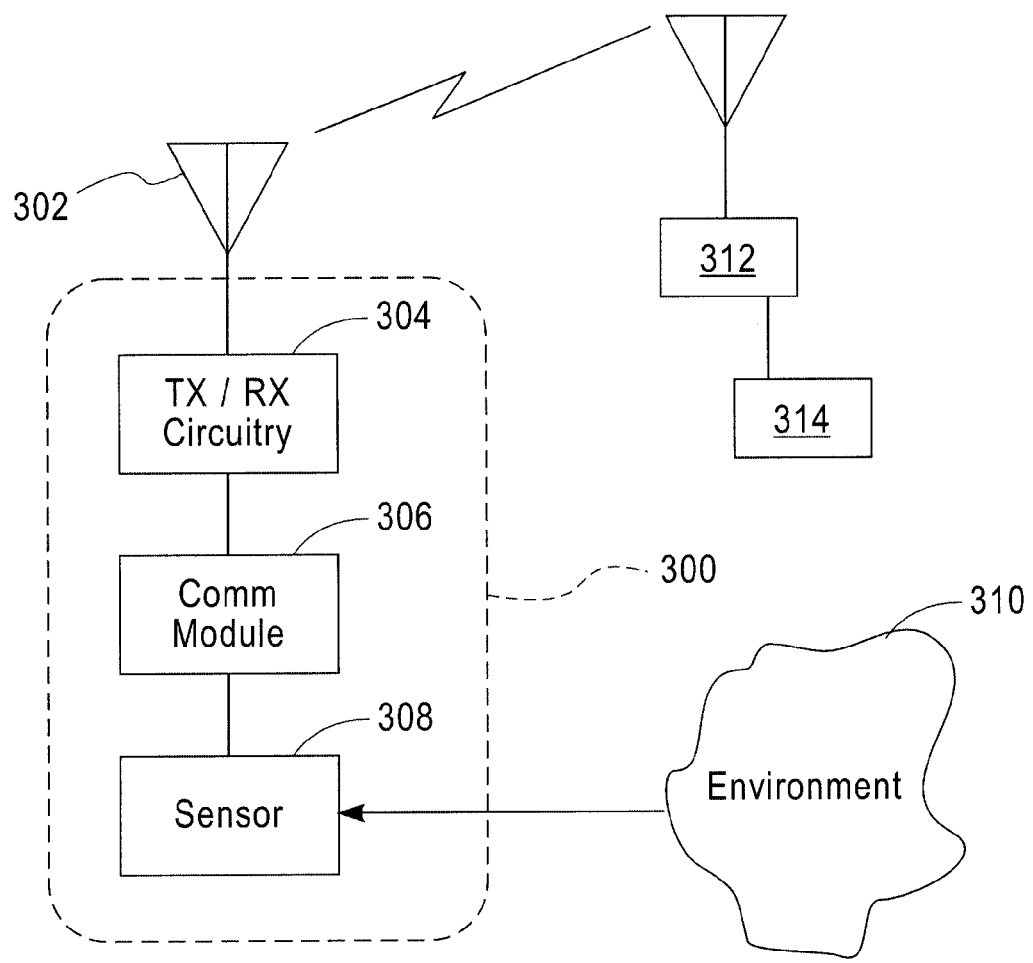
FIG. 3 shows an exemplary pervasive device according to an aspect of the invention.

Turning now to FIG. 3, an exemplary networked pervasive device 300 associated with a network includes at least one environmental sensor 308 configured to obtain environmental data, and a communications module 306 coupled to the at least one environmental sensor and configured to cause transmission of a representation of the data via the network in a form for subsequent data mining within the network. In the example of FIG. 3, the device is a wireless device, and includes an antenna 302, transmit circuitry 304 coupled to the antenna 302 for transmission of radio frequency radiation therefrom, and the aforementioned environmental sensor 308 configured to obtain environmental data from environment 310. Further, device 300 includes the aforementioned communications module 306 coupled to the at least one environmental sensor 308 (and in the example, to circuitry 304) and configured to cause transmission of a representation of the data via the antenna 302 and the transmit circuitry 304.

In one aspect, device 300 comprises a cellular telephone. Further, receive circuitry can be provided, coupled to the antenna 302 and the communications module 306. In the example of FIG. 3, the transmit and receive circuitry is shown as combined transmit/receive circuitry, referred to as element 304, but other approaches are possible. The transmission can be responsive to a polling signal received by the receive circuitry 304, or can be responsive to a signal generated locally by the communications module 306. Communication with the network can be, for example, via a cellular tower with base station 312, coupled, for example, to a central server 314 (or processing in a network of pervasive devices could be employed instead of the central server). While the exemplary pervasive device is shown in wireless form, one or more embodiments of the invention may employ one or more hardwired pervasive devices, in addition to, or in lieu of, wireless devices.

Figure 4:
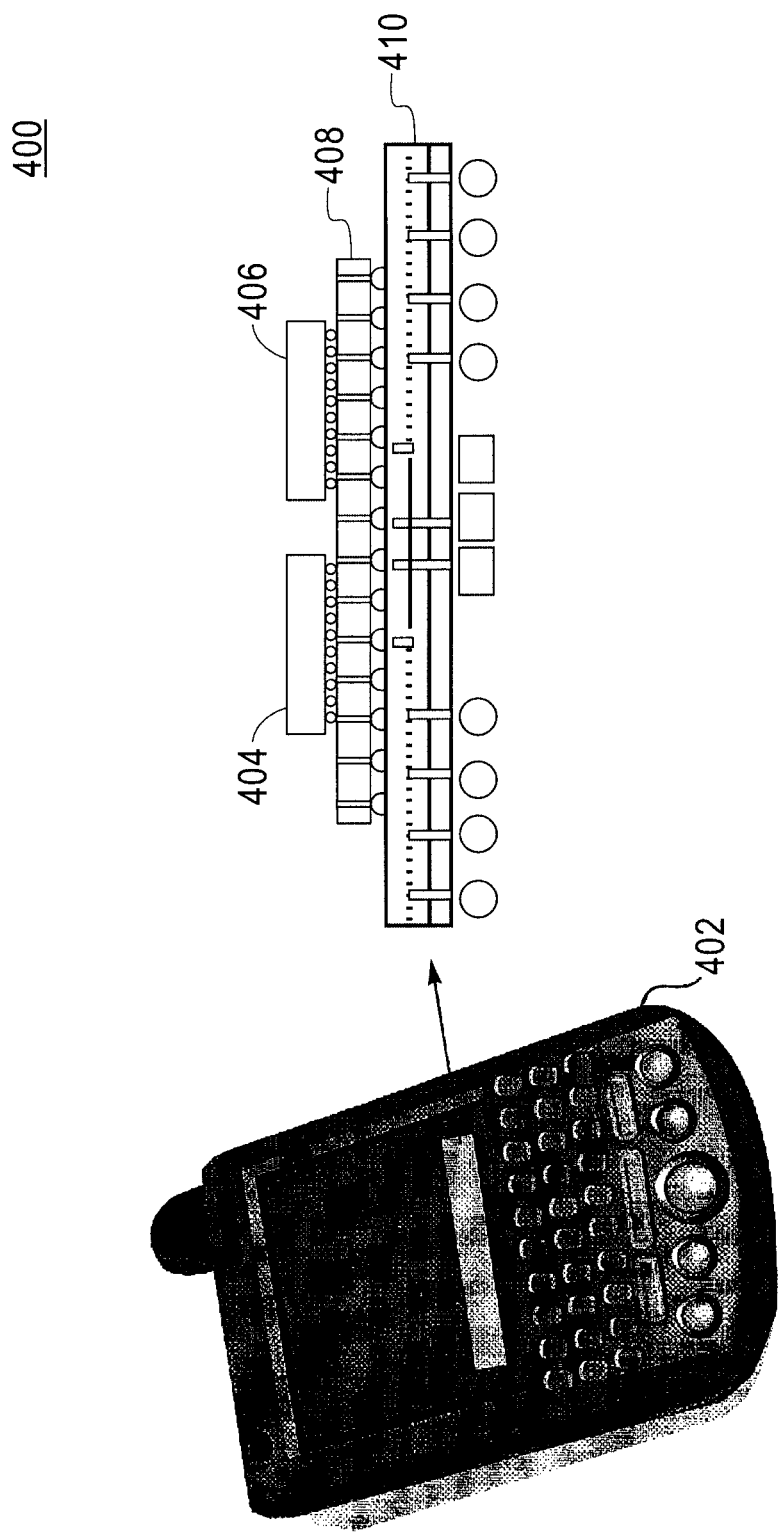
FIG. 4 shows a more specific example of an inventive pervasive computing device.

Turning now to FIG. 4, a more specific example of a wireless pervasive device 400 is in the form of a personal digital assistant (PDA) 402 with enhanced sensing capabilities. A dual axis accelerometer 404 and a temperature sensor 406 can be mounted on a chip carrier 408, forming a sensor-system-on-package, which can be mounted on a circuit board 410 of PDA 402. FIG. 4 thus shows an example of embedding sensors into a pervasive computing device. By way of example and not limitation, the sensors 404, 406 could be micro electro-mechanical systems (MEMS) technology environmental sensors, integrated onto silicon. Suitable temperature sensors and accelerometers are made by Analog Devices, Inc., of Norwood, Mass., USA, model numbers ADIS16003 (accelerometer) and AD590 (temperature sensor). These devices can be integrated onto a chip carrier 408 to produce a very high density system on package for incorporation into the device 402.

It should be understood that the real time identification of events can be used in several ways. Systems can use this information to take autonomic actions; for example, to protect data and/or power down building systems. The data could be used to send instructions to users to take specific appropriate actions, such as to don gas masks and/or evacuate buildings. Emergency systems can be controlled remotely to assist in mitigation or resources in neighboring locations can be notified to take preemptive action.

Many different types of data can be sensed; for example, location (including elevation) via a global positioning system (GPS); camera images, heat, radiation, infra-red radiation (for example, to detect location of humans in environments that are supposed to be empty), soot, abnormal numbers of phone calls, pressure or other indications of thunderstorms, tornadoes, and the like, temperature, and the like. As noted, artificial intelligence or pattern recognition can be employed to determine what is normal and perform appropriate classification and detection. Protection may be afforded against terrorist acts, severe weather, fires, accidents, or even traffic conditions and the like. Data of many disparate types and from many disparate sources can be readily fused, for example, wind conditions, wave heights, air temperature, humidity, traffic or other road or transportation conditions, and in one or more embodiments, can be compared to a baseline. Other possible applications include battlefield management, integration with stolen car locators such as LOJACK® transponder units (LOJACK® is a registered trademark of Lojack Corporation, Westwood, Mass., USA, and the like. Disparate data may be fused and yield a simple, high-level recommendation. For example, suppose there a problem at a nuclear power plant. Wind and radiation sensors might determine and/or predict the area to be affected by a radiation plume. Traffic sensors might determine a best, least congested route, in the opposite direction from the plume, and yield a simple recommendation, such as "Drive north on State Route 9" or simply "Run north."

Figure 5:
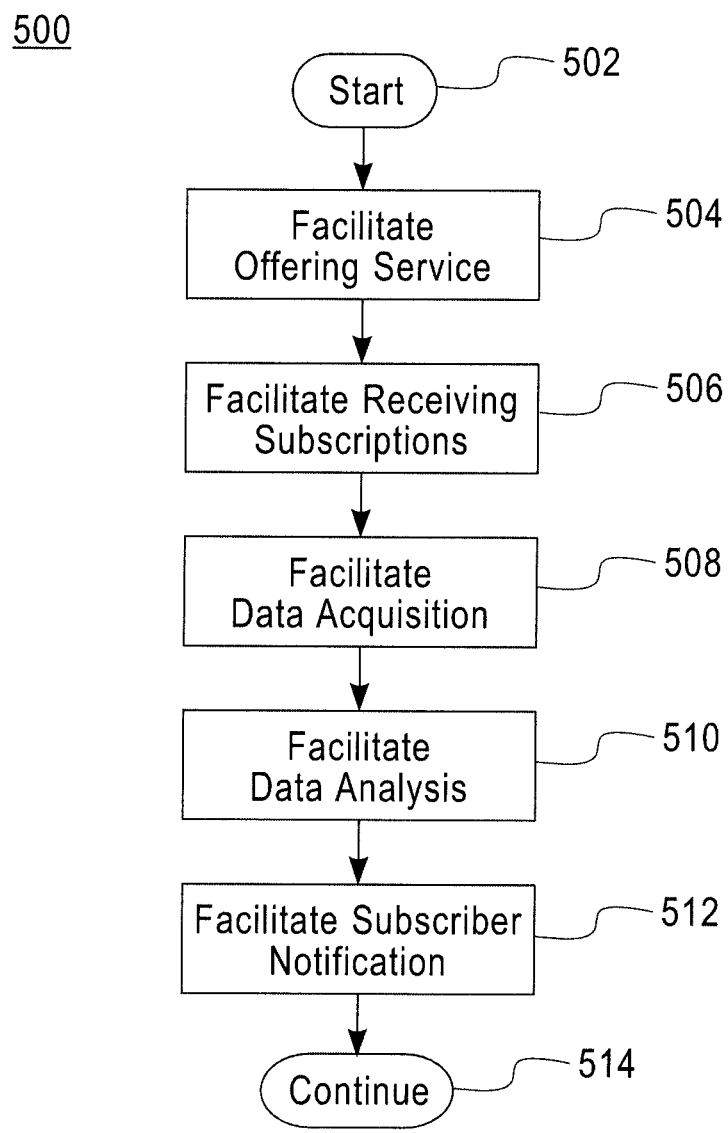
FIG. 5 shows an exemplary process flow for a service offering in accordance with an aspect of the invention.

In another aspect, a service, such as a subscription service, can be offered. With reference to FIG. 5, a flow chart 500 of exemplary method steps for providing a service for monitoring environmental conditions is depicted therein. After beginning at block 502, step 504 includes facilitating offering the monitoring service on a subscription basis. Step 506 includes facilitating receiving subscriptions to the service from a plurality of subscribers. Step 508 includes facilitating acquisition of data pertaining to environmental information using at least one sensor on at least one networked pervasive device, as described above. Step 510 includes facilitating analysis of the data to determine occurrence of at least one environmental event, as described above. Step 512 includes facilitating notification of at least one of the subscribers of the occurrence of the event. Processing continues at block 514. One or more steps can be computer-implemented. Such steps could be performed, for example, by an entity that hosted data and performed integration, working in conjunction with, for example, an interne service provider and a cellular telephone company.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 6:
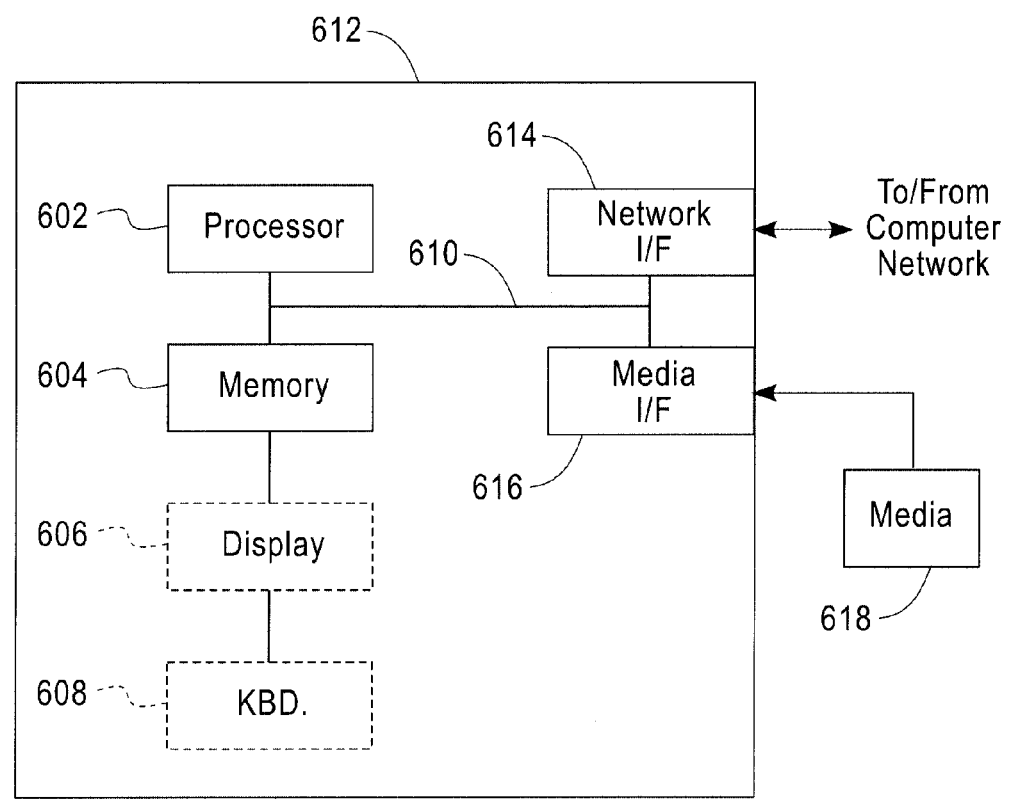
FIG. 6 depicts a computer system that may be useful in implementing one or more aspects and/or elements of the present invention.

At present, it is believed that one or more embodiments will make substantial use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 604), magnetic tape, a removable computer diskette (e.g. media 618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing a service for monitoring environmental conditions, comprising the steps of:
   facilitating offering said monitoring service on a subscription basis;
   facilitating receiving subscriptions to said monitoring service from a plurality of subscribers;
   facilitating acquisition of data pertaining to environmental information using a multiplicity of sensors on a multiplicity of networked pervasive devices;
   facilitating analysis of said data to determine occurrence of at least one environmental event, wherein said analysis is performed by a centralized server which obtains said data from the multiplicity of networked pervasive devices, and wherein said analysis includes fusing said data from the multiplicity of sensors on the multiplicity of networked pervasive devices; and
   facilitating notification of at least one of said subscribers of said occurrence of said event, wherein said notification of said environmental event is provided from the centralized server to at least one of the multiplicity of networked pervasive devices from which said data was obtained, and wherein one or more of said steps are performed by a hardware device, wherein the at least one of the multiplicity of networked pervasive devices functions as both a provider of said data pertaining to the environmental information which is analyzed to determine the occurrence of the at least one environmental event, and a device through which the at least one of said subscribers is notified of said occurrence of said environmental event.

2. The method of claim 1, wherein said analysis is performed to determine a probability that the at least one environmental event is occurring in real time at at least one of the multiplicity of networked pervasive devices.

3. The method of claim 2, wherein the probability is compared to a threshold.

4. The method of claim 3, wherein if the probability exceeds the threshold, said notification of said environmental event is provided from the centralized server to the at least one networked pervasive device.

5. The method of claim 1, wherein said fusing comprises integrating at least two sensed variables with each other to determine a conclusion based on the at least two sensed variables.

6. The method of claim 5, wherein the conclusion is a prediction of an environmental condition based on the at least two sensed variables.

7. The method of claim 5, wherein the conclusion is a prediction of desirability of an activity based on the at least two sensed variables and pre-existing information on ideal conditions for the activity.

\* \* \* \* \*